(12) United States Patent
Dolby et al.

(10) Patent No.: US 10,834,173 B2
(45) Date of Patent: *Nov. 10, 2020

(54) ON-PREMISES AND OFF-PREMISES COMMUNICATION

(71) Applicant: INTERNATIONAL BUSINESS MACHINES CORPORATION, Armonk, NY (US)

(72) Inventors: Trevor C. Dolby, Southampton (GB); Matthew E. Golby-Kirk, Eastleigh (GB); John A. Reeve, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,419

(22) Filed: Oct. 10, 2019

(65) Prior Publication Data

US 2020/0045101 A1 Feb. 6, 2020

Related U.S. Application Data

(63) Continuation of application No. 15/340,034, filed on Nov. 1, 2016, now Pat. No. 10,594,770.

(51) Int. Cl.
*H04L 29/08* (2006.01)
*H04L 29/06* (2006.01)
(Continued)

(52) U.S. Cl.
CPC .............. *H04L 67/06* (2013.01); *G06F 16/00* (2019.01); *H04L 63/0272* (2013.01);
(Continued)

(58) Field of Classification Search
CPC . H04L 67/06; H04L 67/1097; H04L 63/0272; H04L 63/102; H04L 63/00; H04L 41/046; G06F 16/00
See application file for complete search history.

(56) References Cited

U.S. PATENT DOCUMENTS 7,675,914 B2   3/2010  Hamamoto et al.
8,131,828 B2   3/2012  Lin et al.
(Continued)

FOREIGN PATENT DOCUMENTS

CN   104281506 A   1/2015
EP     2947569 A1   11/2015

OTHER PUBLICATIONS

List of IBM Patents or Applications Treated as Related, Oct. 10, 2019, 2 pgs.
(Continued)

*Primary Examiner* — Todd L Barker
(74) *Attorney, Agent, or Firm* — Brian Restauro; Matthew M. Hulihan; Heslin Rothenberg Farley & Mesiti PC

(57) ABSTRACT

Proposed are concepts for managing communication between off-premises and on-premises servers. A file system event request from an application of a first server (such as an off-premises server or an on-premises server) is received and a requested file system is determined based on the received file system event request. Stored file system path data associated with the requested file system can then be identified. The file system event request is then communicated to a second server (such as an on-premises server or off-premises server) based on the identified file system path data.

12 Claims, 9 Drawing Sheets

(51) Int. Cl.
  *G06F 16/00* (2019.01)
  *H04L 12/24* (2006.01)
(52) U.S. Cl.
  CPC .......... *H04L 63/102* (2013.01); *H04L 41/046* (2013.01); *H04L 63/00* (2013.01); *H04L 67/1097* (2013.01)

(56) References Cited

U.S. PATENT DOCUMENTS

| | | |
|---|---|---|
| 9,137,220 B2 | 9/2015 | Crosbie et al. |
| 9,251,114 B1 | 2/2016 | Ancin et al. |
| 9,479,567 B1 | 10/2016 | Koorapati et al. |
| 9,866,599 B2 | 1/2018 | Boneh et al. |
| 9,917,912 B2 | 3/2018 | Almond et al. |
| 10,148,500 B2 | 12/2018 | Marino et al. |
| 10,180,947 B2 | 1/2019 | Malhotra et al. |
| 10,210,172 B1 | 2/2019 | Konig et al. |
| 10,348,516 B2 | 7/2019 | Coleman et al. |
| 2003/0115218 A1 | 6/2003 | Bobbitt et al. |
| 2008/0288609 A1 | 11/2008 | Pramberger |
| 2010/0088414 A1 | 4/2010 | Lin et al. |
| 2010/0154038 A1 | 6/2010 | Natarajan |
| 2011/0258333 A1 | 10/2011 | Pomerantz et al. |
| 2014/0040196 A1 | 2/2014 | Wijayaratne et al. |
| 2014/0108665 A1 | 4/2014 | Arora et al. |
| 2014/0244791 A1 | 8/2014 | Fellows et al. |
| 2015/0127937 A1 | 5/2015 | Ali et al. |
| 2015/0188779 A1 | 7/2015 | McCanne et al. |
| 2015/0373103 A1 | 12/2015 | Tessier et al. |
| 2016/0212120 A1 | 7/2016 | Bryant et al. |
| 2016/0283512 A1 | 9/2016 | Beale |
| 2016/0323358 A1 | 11/2016 | Malhotra et al. |
| 2017/0034267 A1 | 2/2017 | Nagasubrannaniann et al. |
| 2017/0093955 A1 | 3/2017 | Evans et al. |
| 2017/0124170 A1 | 5/2017 | Koorapati et al. |
| 2017/0180184 A1 | 6/2017 | Korotkov |
| 2017/0249328 A1 | 8/2017 | Liang et al. |
| 2017/0300706 A1 | 10/2017 | Jassal et al. |
| 2018/0124153 A1 | 5/2018 | Dolby et al. |

OTHER PUBLICATIONS

"OwnCloud and IBM: Enabling secure and agile file sharing across the enterprise", IBM Systems Solution Brief. Retrieved from the Internet: <URL: https://owncloud.com/wp-content/uploads/2015/06/DS-IBM-ownCloud-Joint-Solution-Brief.pdf>, IBM Corporation 2015, 6 pgs.

Mell, Peter, et al., "The NIST Definition of Cloud Computing", NIST Special Publication 800-145, Sep. 2011, Gaithersburg, MD, 7 pgs.

International Search Report/Written Opinion for PCT/IB2017/056750 dated Jan. 17, 2018, 11 pgs.

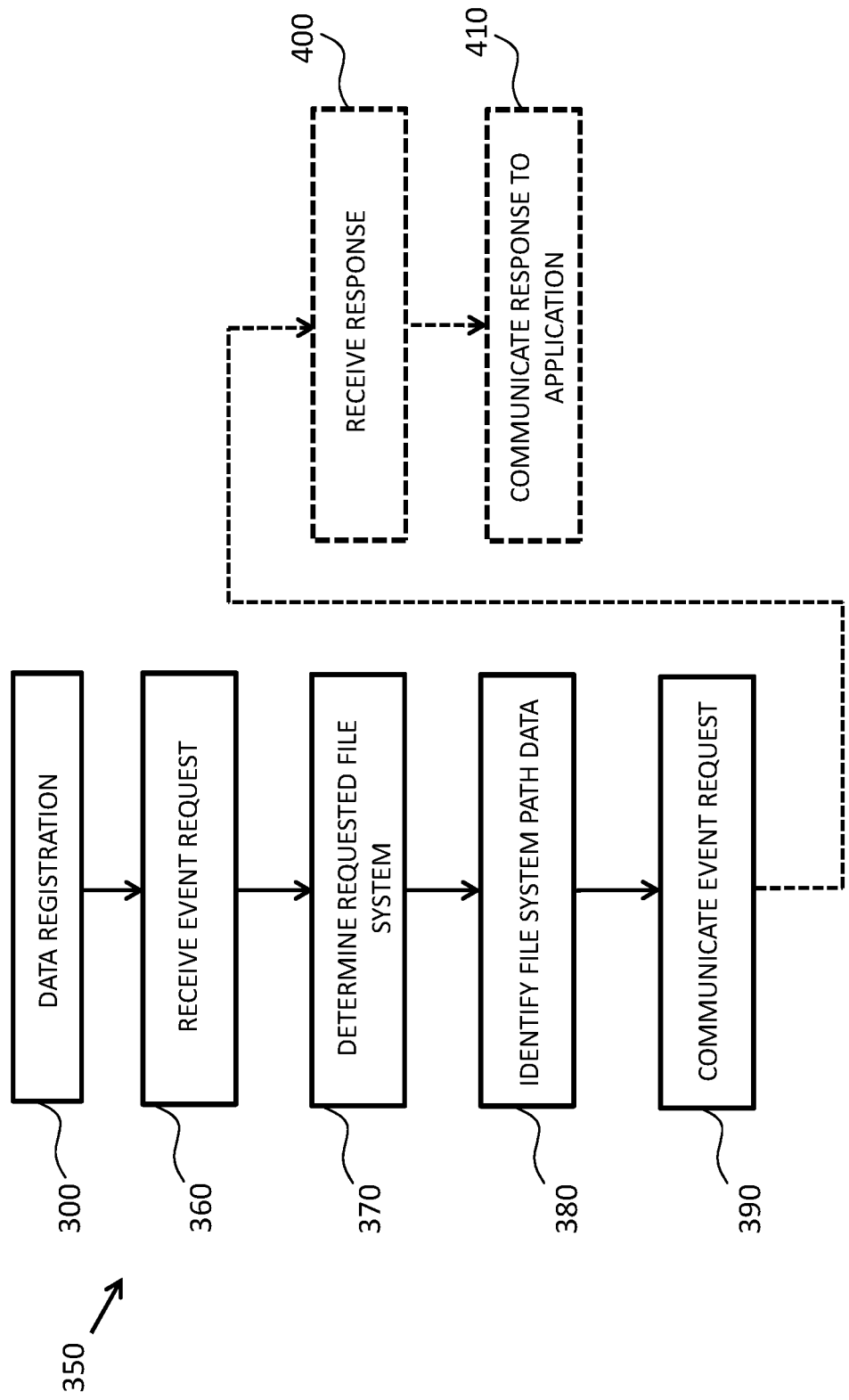

ON-PREMISES AND OFF-PREMISES COMMUNICATION

BACKGROUND

Communication between on-premises and off-premises platforms occurs in a Software as a Service (SaaS) environment. SaaS is a software licensing and delivery model in which software is licensed on a subscription basis and is centrally hosted by an off-premises platform (such as a shared computing resource or a cloud computing resource accessible via the Internet for example). SaaS is typically accessed by users of an on-premises platform (for example, using a thin client via a web browser).

On-premises platforms are well-established and considered to provide a good level of security because data is stored and handled internally, e.g., within an internal private network.

Off-premises platforms (such as cloud computing resources) are a relatively recent and evolving concept. Generally, reference to off-premises resources or platforms is taken to refer to a concept for enabling ubiquitous, convenient, and on-demand access via Internet to shared pools of configurable off-premises (e.g. remotely located) computing resources such as networks, file systems, servers, storages, applications, functionalities, and the like which are accessible via the Internet. Conversely, reference to on-premises resources or platforms is taken to refer to a concept of local or private computing resources such as networks, servers, storage devices, application, etc. that are situated locally or within/behind a virtual boundary (often behind a firewall).

Due to the communication between on-premises and off-premises platforms in a SaaS environment, data file systems in a SaaS environment frequently need to integrate with systems of record within a datacenter behind a firewall. Typically, this is done by using Virtual Private Network (VPN) technology. To set this up is complicated and has security issues (because the VPN technology has the potential to expose more access to the end system than just a directory in a file system). Also, the nature of cloud computing is that systems needing access to a file system (and systems providing the file systems) can be highly dynamic with systems being repeatedly and/or continuously destroyed or recreated.

SUMMARY

Aspects described herein relate to communicating between on-premises and off-premises platforms, and further to computer program products and connectivity components (such as a switch component for example) to implement methods of communicating between on-premises and off-premises platforms.

Shortcomings of the prior art are overcome and additional advantages are provided through the provision of a computer system that includes a memory and a processor in communication with the memory. The computer system is configured to perform a method that includes storing, in a file system path data store, file system path data associated with a plurality of different remote file systems. The file system path data store is part of a switch component of a first network of a first location. The first network also includes a first server in communication with the switch component across the first network. The remote file systems are of different servers of a plurality of different networks of different locations remote from the first location. The first network is in communication with the plurality of different networks across one or more wide area network communication links. The stored file system path data includes, for each remote file system of the remote file systems, a respective identification of a server, of the different servers, of which the remote file system is a part. The method also includes receiving, across the first network, by the switch component, a file system event request from an application of the first server. The file system event request is a request by the application for a file system event to be completed against a requested remote file system of the remote file systems. The requested file system is a remote file system of a second server at a second location remote from the first server at the first location. The method also includes processing, by a routing component of the switch component, the file system event request in conjunction with the stored file system path data. The processing includes identifying the requested file system, from the plurality of different remote file systems for which the file system path data is stored, based on an identification portion of the received file system event request identifying that the requested file system is the remote file system. The processing also includes identifying, from the stored file system path data, file system path data associated with the requested file system. The file system path data is associated with the requested file system including the identification of the second server of which the requested file system is a part. The method also includes communicating, by the switch component, the file system event request to the second server based on the identified file system path data associated with the requested file system identifying that the requested file system is of the second server.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3B depicts a flow diagram of a method for managing communication between off-premises and on-premises resources according to an embodiment described herein;

DETAILED DESCRIPTION

Figure 1A:
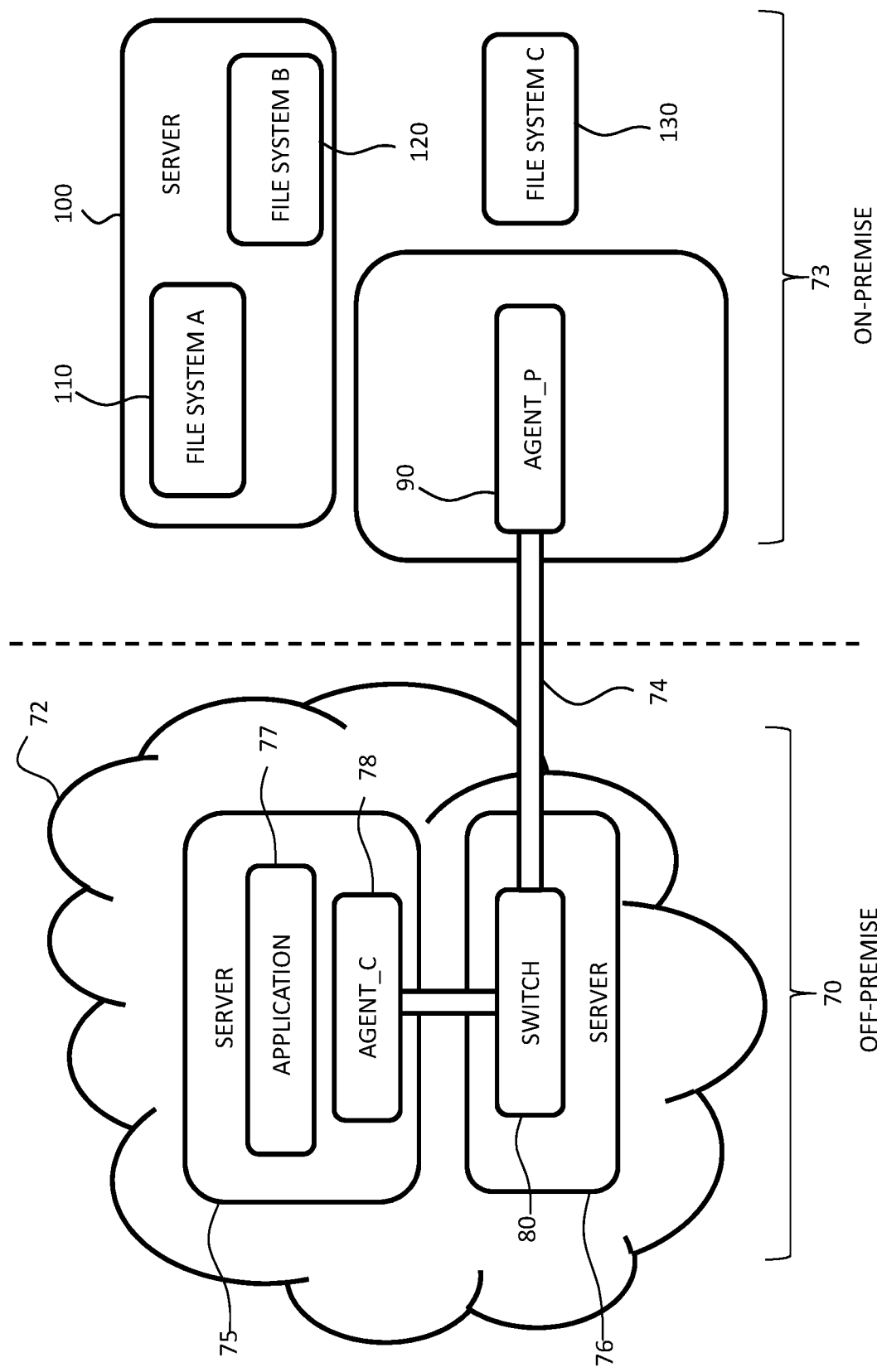
FIG. 1A is a simplified block diagram of an exemplary implementation of an embodiment described herein.

Aspects described herein provide components for managing communication between off-premises and on-premises platforms that can expose a file system and enable dynamic access without the need for a VPN or mounted Network File System (NFS). Further provided is a computer program product including computer program code for implementing proposed communication concepts when executed on a processor, and a network component (such as a connectivity component) adapted to execute this computer program code.

According to an embodiment there is provided a connectivity component adapted to manage communication between off-premises and on-premises servers. The connectivity component can include a file system path data store adapted to store file system path data associated with one or more file systems, a first communication component adapted to receive a file system event request from an application of an off-premises server or an on-premises server, a routing component adapted to determine a requested file system based on the received file system event request and to identify stored file system path data associated with the requested file system, and a second communication component adapted to communicate the file system event request to an on-premises server or off-premises server based on the identified file system path data.

Proposed is a concept communicating file system event requests between off-premises and on-premises sites/resources. This may allow an agent running in a cloud system, for example, to act like a directory of an on-premises file system. A cloud-based application using the file system may then write/read to this directory like it would to any other directory on its local file system.

Such proposals may be seen to be less about sharing documents or files and more about the log files (e.g. file system event logs) or transient data that is being processed as it is added to a file. The file data in these cases may therefore not be needed to be stored in the cloud, but instead just accessed so a cloud-based application can process data from the file or log activity to a file. An advantage of this being directly written to an on-premises file system may be that users need not change current file processing applications in order to connect to a cloud-based system. Instead, the users may be able to continue to access a standard file system. This may be true of both the applications running on-premises and applications running off-premises (e.g. in the cloud, the application may write to the local file system of the container it is running in).

Unlike conventional products that transfer files around the system (once all writing to a file is finished), proposed embodiments may allow for continuous appending to a file where the appended parts may be sent to the end system after, e.g., every write. Embodiments may therefore be suitable for log/trace files or files that have single records written at a time while being processed in real time.

Proposed concepts may allow file systems to be split into a set of file systems that can be configured to run either in the off-premises (e.g. cloud) environment, or on-premises environment. File systems may then be able to invoke each other and exchange data in an optimal manner. For example, the file systems may be separated such that the ones that require access to on-premises systems of record run in the on-premises servers, and ones that would benefit from off-loading their computationally intensive processing run in the off-premises infrastructure. A connectivity component, such as a switch component, is thus proposed which may manage communication between the off-premises and on-premises systems by receiving a file system event request from an off-premises server and then communicating the request to an on-premises server based on identified file system path data. Such file system path data may be identified by the connectivity component using a data store which is adapted to store file system path data associated with on-premises file systems.

Proposed concepts may avoid mapping of file system paths between the off-premises system (e.g. SaaS environment) and the on-premises system. Instead, embodiments may be configured to only exchange data between the file system data paths available in each environment. This may provide the performance benefit of reducing an amount of network traffic over the internet. It may also avoid having to expose credentials to off-premises parts.

In some environments, the first communication component of the connectivity component may be adapted to establish a secure tunnel for receiving the file system event request. Similarly, the second communication component may be adapted to establish a secure tunnel communicating the file system event request. For example, a mutually authenticated TLS tunnel connection may be to transfer data between the two environments. Secure communications between off-premises and on-premises platforms may therefore be provided.

In an embodiment, the connectivity component may further include a registration module adapted to receive file system path data from at least one of: an application of an off-premises server, an application of an on-premises server, an off-premises server module, and an on-premises server module. The registration module may then be adapted to store received file system path data in the file system path data store. Embodiments may therefore employ the concept of registering information about accessing or making use of a file system with the connectivity component so that the connectivity component can identify how to handle (e.g. where to communicate) a request for said file system. By using such a registration concept, a data store of file system path data may be dynamically updated or maintained to reflect changes in available file systems or severs.

For example, the registration module may be adapted to remove file system path data from the data store based on or in response to at least one of: an application, a server, and a file system becoming inaccessible (e.g. being disconnected, terminated, or powered-down). Proposed concepts may therefore provide a dynamically updated store of file system path information representing data file systems that may be accessible and how (e.g. file system name, server location/address, supported file system events, etc.). Embodiments may therefore provide a connectivity component that can adapt to implementation specifics and cater for changes in available resources (e.g. applications, service and/or file systems), thereby providing a high degree of flexibility and adaptability.

By way of example, the file system path data may include at least one of: a file system name, a server identification, a server address, a file system version identifier, supported file system events, permitted file system events, permission information, authentication information, and checksum information. File system path data may, for instance, include information relating to the identity of a file system. Such identification information may then be used to match a file system request to a system running the required file system. Alternatively, or additionally, file system path data may include information relating to a version or checksum in order to enable more complex matching. For example, the requester could provide a conditional call/request that calls/requests a file system named "filesystem1" which is at least at level 3 or higher. Similarly, the requester could ask to run a file system named "filesystem2" that has a check sum of 22983098923 so that it could ensure it was calling a file system that had the correct code associated with it.

Alternatively, or additionally, file system path data may include information relating to the relative location of a file system path.

File system path data may include information to identify a system on which a file system is running. This may be purely used as operational information so an administrator can see what systems are offering particular file systems. However, it may also be used for additional levels of security where only certain systems are allowed to register. Thus, file system path data may include information relating to the location of (i) a file system or (ii) a data path of the file system.

In an embodiment, the off-premises server may include a cloud sever, and the application may include a cloud application of the cloud server. Embodiments may therefore be employed in a SaaS environment for the provision of cloud-based services over the internet for example.

By way of example, the file system event request may include at least one of: a file system name, file system event, a data payload, and entry point data. The file system event request may therefore include information relating to the file system, an event (e.g. read, write, delete, append, purge, edit, etc.) to be completed by the file system, data to be processed by the file system, and/or and entry point in the file system that the request would be made to. A file system event request may thus include an identification portion and a payload portion. Inclusion of entry point data (such as path identification information, for example) in a file system event request may enable specification of an entry point in file system to which the request is made. For example, a file system called "filesystem1" could have two entry points called "path1" and "path2". The file system event request may then include the file system name and the entry point within the file system, such as "file system1/path1" for example. If no entry point information is employed, a default entry point (e.g. home/root directory or path) may be used.

In embodiments, the first communication component may be adapted to receive a file system event request from an off-premises server, and the second communication component may be adapted to communicate the file system event request to an on-premises server based on the identified file system path data. In this way, requests may be received from off-premises resources and routed by the connectivity component to the appropriate on-premises resource(s).

Alternatively, or additionally, the first communication component may be adapted to receive a file system event request from an on-premises server, and the second communication component may be adapted to communicate the file system event request to an off-premises server based on the identified file system path data. This arrangement may enable an on-premises resource to transmit a request for an off-premises resource via the connectivity component so that the request is routed to the appropriate off-premises resource.

Also, in some embodiments, the second communication component may be adapted to receive a response to the communicated file system event request, and the first communication component may be adapted to communicate the received response to the application. In this way, a response to a file system event request may be communicated back to the application that originated the file system event request. Proposed connectivity components may therefore provide for the management of communication between off-premises and on-premises platforms so that requests and responses are appropriately delivered while avoiding excessive communication traffic.

Embodiments may be employed or implemented in a switch module. For example, there may be provided a switch module including a connectivity component according to a proposed embodiment. Also, embodiments may be implemented in a server device. Such a server device may be a cloud-based server resource accessible via the Internet.

According to another aspect, there is provided a computer-implemented method of managing communication between off-premises and on-premises servers. The method can include storing, in a file system path data store, file system path data associated with one or more file systems, receiving a file system event request from an application of an off-premises server or an on-premises server, determining a requested file system based on the received file system event request, identifying stored file system path data associated with the requested file system, and communicating the file system event request to an on-premises server or off-premises server based on the identified file system path data.

The receiving a file system event request may include establishing a secure tunnel for receiving the file system event request, and the communicating the file system event request may include establishing a secure tunnel for communicating the file system event request.

Embodiments may include receiving file system path data from at least one of: an application of an off-premises server, an application of an on-premises server; an off-premises server module, and an on-premises server module, and storing received file system path data in the file system path data store.

Also, some embodiments may further include removing file system path data from the file system path data store in response to at least one of: an application, a server, and a file system becoming inaccessible.

Receiving a file system event request may, for example, include receiving a file system event request from an off-premises server. Further, communicating the file system event request may include communicating the file system event request to an on-premises server based on the identified file system path data.

In some embodiments, receiving a file system event request may include receiving a file system event request from an on-premises server. Also, communicating the file system event request may include communicating the file system event request to an off-premises server based on the identified file system path data.

Embodiments may further include: receiving a response to the communicated file system event request, and communicating the received response to the application.

According to another embodiment, there is provided a computer program product for managing communication between off-premises and on-premises servers, the computer program product include a computer readable storage medium having program instructions embodied therewith, the program instructions executable by a processing unit/processor to cause the processing unit/processor to perform a method according to one or more proposed embodiments when executed on at least one processor of a data processing system/computer system.

According to yet another aspect, there is provided a processing system/computer system including at least one processor and the computer program product according to one or more embodiments, wherein the at least one processor is adapted to execute the computer program code of the computer program product.

The processing system may be adapted to act as a switching component between an on-premises server and an off-premises server.

The processing system may be adapted to implement a part of an off-premises platform, such as a cloud-based system or server.

Thus, there may be proposed a system that evaluates a file system event request and determines where to communicate the request based on stored data associated with file systems. Taking such an approach may enable dynamic file system access between on-premises and off-premises platforms without the need for a VPN or NFS (or similar mounted file system). For instance, it may enable a cloud-based agent to connect to a switch component/application (e.g. running in the cloud) using TCP/IP and send file system events to a server of a file system for each file event it receives. The on-premises agent would receive these file events over TCP/IP and then mimic them on the on-premises file system (s). The on-premises agent may be replaced or moved between on-premises machines without the cloud-based agent seeing any change. The reverse may also be enabled, wherein the cloud-based agent may be moved to a different cloud container without the on-premises agent knowing or needing to change.

It should be understood that the Figures are merely schematic and are not drawn to scale. It should also be understood that the same reference numerals are used throughout the Figures to indicate the same or similar parts.

In the context of the present application, where embodiments constitute a method, it should be understood that such a method is a process for execution by a computer, i.e. is a computer-implementable method. Various aspects, such as steps, of the method therefore reflect various parts of a computer program, e.g. various parts of one or more algorithms.

Also, in the context of the present disclosure, a (processing/computer) system may be a single device or a collection of distributed devices that are adapted to execute one or more embodiments of the methods or processes described herein. For instance, a system may be a personal computer (PC), a server or a collection of PCs and/or servers connected via a network such as a local area network, the Internet and so on to cooperatively execute at least one embodiment of the methods or processes described herein.

A "file system" may be understood as being a file or data storage construct that may provide in a hierarchical structure or order of directories and sub-directories, for example. A path may therefore be used to represent a location within the data storage construct (for the purpose of accessing data at a location within the construct for example). Within such a construct, actions or events may be undertaken to access, modify, change, remove, alter, etc. files or data stored by within the construct. Such events may include reading, writing, deleting, modifying, purging, appending or the like. Thus, when employed for integration between off-premises and on-premises resources (such as may be done in cloud-based provision of software to a user of an on-premises resource, or as part of a SaaS environment), one or more of the files or pieces of data of a file system may be accessed by an external system, thus requiring communication between the off-premises and on-premises resources.

Proposed are concepts for establishing and/or managing communication between off-premises and on-premises platforms, wherein the data processing file systems may be split or separated into file systems which can be implemented in the off-premises environment or in the on-premises environment and wherein the file systems may invoke each other and exchange data via a connectivity component (e.g. a switching module). A connectivity component may thus be implemented to receive file system requests and forward such requests to the appropriate destination (e.g. file system path), wherein the appropriate destination is determined based on a data store comprising information about the file systems.

Embodiments may therefore reduce network traffic and/or avoid having to expose credentials to off-premises parts.

For instance, proposed concepts may enable an off-premises file system to be invoked by an on-premises file system, and/or vice versa. File systems that may benefit from being implemented on the off-premises systems may therefore be run in off-premises servers, whereas file systems that may benefit from being implemented on the on-premises systems (e.g. those expecting the storage capabilities or security of on-premises systems) may be run in on-premises servers.

Illustrative embodiments may therefore provide concepts for communicating between off-premises resources and on-premises resources. Dynamic distributed processing and data storage optimization may therefore be provided by proposed embodiments.

Modifications and additional steps to a traditional SaaS implementation may also be proposed which may enhance the value and utility of the proposed concepts.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention.

Also, those of ordinary skill in the art will appreciate that the hardware and/or architectures in the Figures may vary depending on the implementation. Further, the processes of the illustrative embodiments may be applied to multiprocessor/server systems, other than those illustrated, without departing from the scope of the proposed concepts.

Moreover, the system may take the form of any of a number of different processing devices including client computing devices, server computing devices, a tablet computer, laptop computer, telephone or other communication devices, personal digital assistants (PDAs), or the like. In some illustrative examples, an off-premises device and an on-premises device may include a portable computing device that is configured with flash memory to provide non-volatile memory for storing operating system files and/or user-generated data, for example. Thus, the system may essentially be any known or later-developed processing system without architectural limitation.

A proposed concept may enhance a cloud-based service provisioning system by reducing network traffic or making operations more efficient. Embodiments may enable file system event requests to be analyzed and forwarded to appropriate destinations off-premises or on-premises so as to establish connectivity between off-premises and on-premises platforms. Such proposals can extend or improve the processing capabilities or efficiency of a cloud-based software delivery system.

Figure 1B:
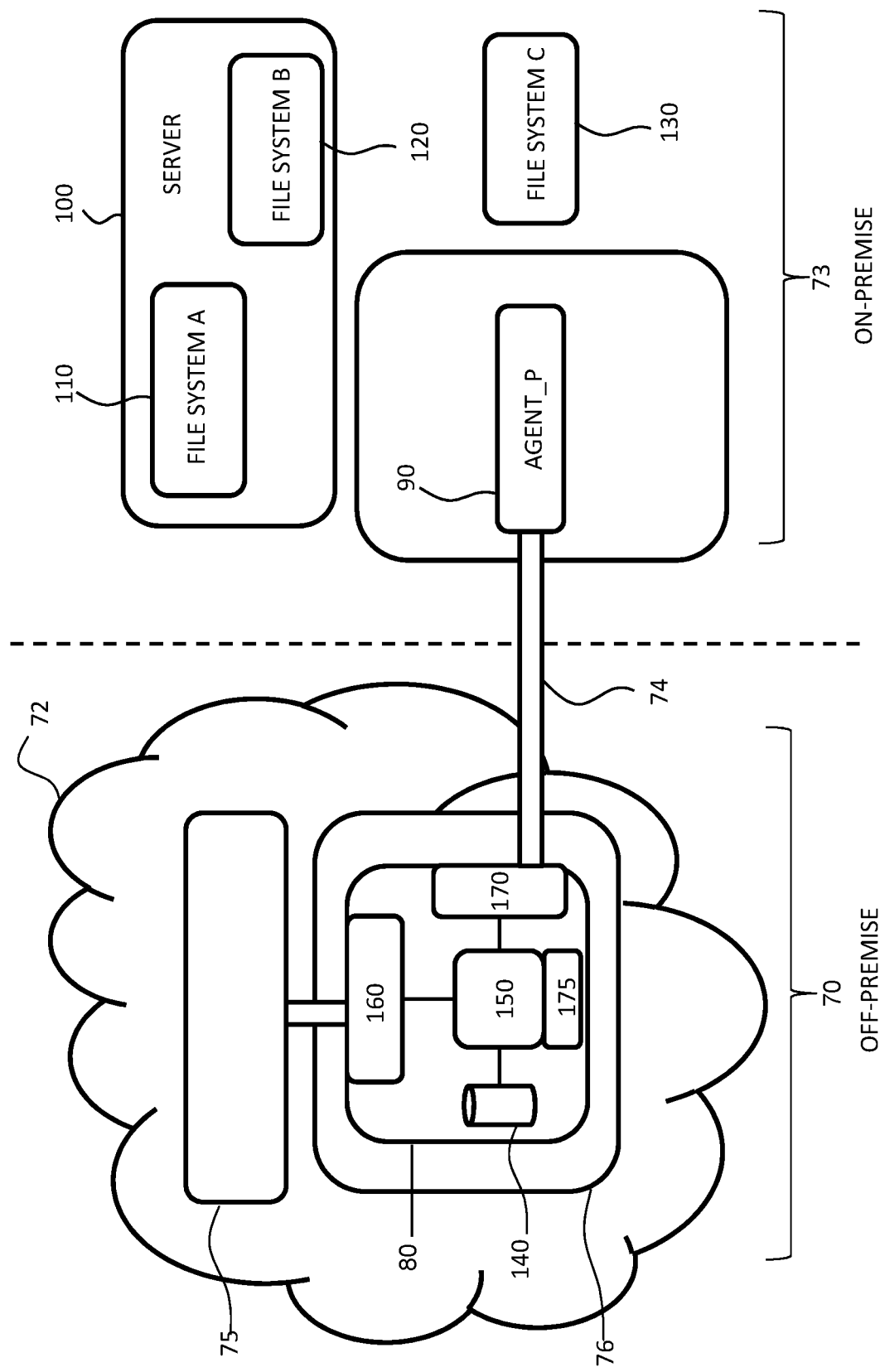
FIG. 1B is a modified version of FIG. 1A, wherein components of the switching component are illustrated, in accordance with aspects described herein.

Turning now to FIGS. 1A & 1B, an exemplary implementation of an embodiment will now be described. Here, a cloud-based software delivery service includes off-premises resources 70 in the cloud 72 which are accessible to on-premises resources 73 via an Internet communication link 74.

The off-premises resources 70 include first off-premises server 75 and second off-premises server 76. The first off-premises server 75 is a cloud-based server 75 and includes an application 77 and a first server module/agent 78 (labeled "AGENT_C"). The second off-premises server 76 is a cloud-based server 76 and includes a switching component (i.e. connectivity component) 80 adapted to manage communication between the first off-premises server 75 and the on-premises resources 73.

The on-premises resources 73 include a local module/agent 90 ("AGENT_P"), first file system 110 ("FILE SYSTEM A"), second file system 120 ("FILE SYSTEM B") and third file system 130 ("FILE SYSTEM C"), and a database server 100 implementing the first file system 110 and second file system 130.

Referring now to FIG. 1B, wherein the switching component 80 is shown in more detail, the switching component 80 includes a data store 140, a routing component 150, a first communication component 160, and a second communication component 170.

The data store 140 includes a file system path data store adapted to store file system path data associated with file systems that are implemented by the on-premises resources 30. By way of example, the file system path data may include information relating to file system names, server identifications, server addresses, file system version identifiers, supported file system events, permitted file system events, permission information, authentication information, and/or checksum information, as examples. The file system path data may be provided to the data store 140 by servers or applications (e.g. file system applications) when they are made available by the on-premises resources 73. For this purpose, the switching component 80 also includes a registration module 175 that is adapted to receive file system path data from at least one of: an application of an off-premises server, an application of an on-premises server, an off-premises server module, and an on-premises server module. The registration module 175 may be adapted to store received file system path data in the file system path data store 140, thus enabling the concept of registering information with the switching component 80 so that it may identify how to handle (e.g. where to communicate) a file system request. Also, the registration module 175 may be adapted to remove information from the file system path data store 140 in response to an application, a server, and/or a file system becoming inaccessible (e.g. being disconnected, terminated, or powered-down). A registering server or application may therefore register information to identify a file system that it provides. This registered information can then be used to match an event call/request for a file system to a system running the required file system.

Put another way, the data store 140 may be adapted to be dynamically updated or maintained in order to reflect changes in available file systems or resources.

The data store 140 may therefore provide a dynamically updated store of endpoint information representing file systems that may be accessible. In this way, the switching component 80 may adapt to implementation specifics and cater for changes in available resources (e.g. applications, service and/or file systems), for example for the registration/deregistration of file system path data to/from the data store 140.

The first communication component 160 is adapted to receive a file system event request from the application 77 of the first off-premises server 75 (via the first server module/agent 78). For this purpose, the first communication component 160 is adapted to establish a secure tunnel for receiving the file system event request.

A file system event request is a request to access or invoke a file system provided by the on-premises resources 73. By way of example, a file system event request of this embodiment includes an identification portion and a payload portion, wherein the identification portion includes information relating to the identification of a file system (such as a file system name for example), and wherein the payload portion includes a data payload (such as a file location information (e.g. directory or path), a file system event (e.g. read, write, delete, append, purge, edit, etc.) to be completed by the file system, and data for use in/by the file system for example).

Upon receiving a file system event request, the first communication component 160 passes the received request to the routing component 150. The routing component 150 is adapted to process the received request in conjunction with data stored in the data store 140 in order to determine a requested file system and stored file system path data associated with the requested file system. By way of example, the routing component 150 is adapted to analyze the identification portion of the received file system event request to identify the requested file system (for example, based on a file system name included in the identification portion). Further, based on the identified requested file system, the routing component 150 is then adapted to query the data store 140 to identify file system path data that is associated with the identified requested file system.

The routing component 150 passes the received file system event request to the second communication component 170 along with the identified file system path data associated with the identified requested file system. The second communication component 170 is adapted to communicate the received file system event request to the on-premises resources 73 based on the identified file system path data associated with the identified requested file system. For this purpose, the second communication component 170 is adapted to establish a secure tunnel for communicating the file system event request. For example, the second communication component 170 may establish a mutually authenticated TLS tunnel connection between the switching component 80 and the local module/agent 90.

Thus, from the description above, the switching component 80 may have first and second secure components for establishing tunnels with off-premises and on-premises server modules, respectively. The switching component 80 may also include a registration component that is adapted to register and store (in a data store of the switching component 80) file system path data (e.g., file system names, server IDs, server addresses, file system version identifiers, supported file system events, permitted file system events, permission information, authentication information and checksum information) associated with file systems. Applications or servers may therefore register information with the switching component 80 when they connect and/all when a configuration changes. Such information may also be deregistered (e.g. removed or deleted from the data store) when an application or server becomes inaccessible (e.g. is disconnected, powered down or otherwise unavailable). Received calls (e.g. requests) to execute a file system event may thus be analyzed by the switching component 80 and be used to query the dynamically maintained data store to identify file system path data indicative of where to communicate the requested event.

The switching component 80 may therefore enable a cloud application to call a file system of an on-premises server, wherein the call is handled and communicated to the appropriate on-premises server by the switching component 80. Conversely, the switching component 80 may enable an on-premises file system to call a file system of an off-premises server.

By way of example, and with reference to FIG. 2, an example of a cloud-based application 77 of the first server 75 calling the first file system 110 "FILE SYSTEM A" (which resides on an on-premises database server 100) will now be described.

Firstly, as indicated by the arrow labeled "A", the application 77 of the first server 75 communicates a file system event request to the switching component 80 via the first server module/agent 78 (labeled "AGENT_C"). This communication is established using a secure tunnel between the first server module/agent 78 (labeled "AGENT_C") and the first communication component 160 (see FIG. 1B) of the switching component 80. The file system event request in this example includes: an identification portion including the name of the first file system 110, namely SUBFILE SYSTEM A, and payload including: event data including a file system event (such as "read" for example), entry point data representing a location a data for the event, and payload including data representing a file stored in the file system 110.

Next, as indicated by the label "B", the switching component 80 determines the requested file system from the identification portion of the file system event request, and subsequently queries the data store 140 of the switching component 80 to determine file system path data associated with the requested file system (FILE SYSTEM A).

Based on the determined file system path data, the second communication component 170 (see FIG. 1B) then communicates the file system event request to the first file system 110 ("FILE SYSTEM A") of the on-premises resources 73 as indicated by the arrows labeled "C" and "D". This communication is established using a secure tunnel between the second communication component 170 and the local module/agent 90 ("AGENT_P").

Finally, the first file system 110 executes requested file system event indicated by the data payload (of the file system event request), for example read data of a particular file stored in a specified location of the file system.

Thus, from the above example, it will be seen that the switching component 80, the first server module/agent 78 (labeled "AGENT_C"), and the local module/agent 90 ("AGENT_P") manage mutually authenticated TLS connections. In this diagram, the first file system 110 is implemented on an on-premises database server 100 and the credentials required to access the database server 100 need only be known to the on-premises resources (and not the off-premises servers).

Figure 2:
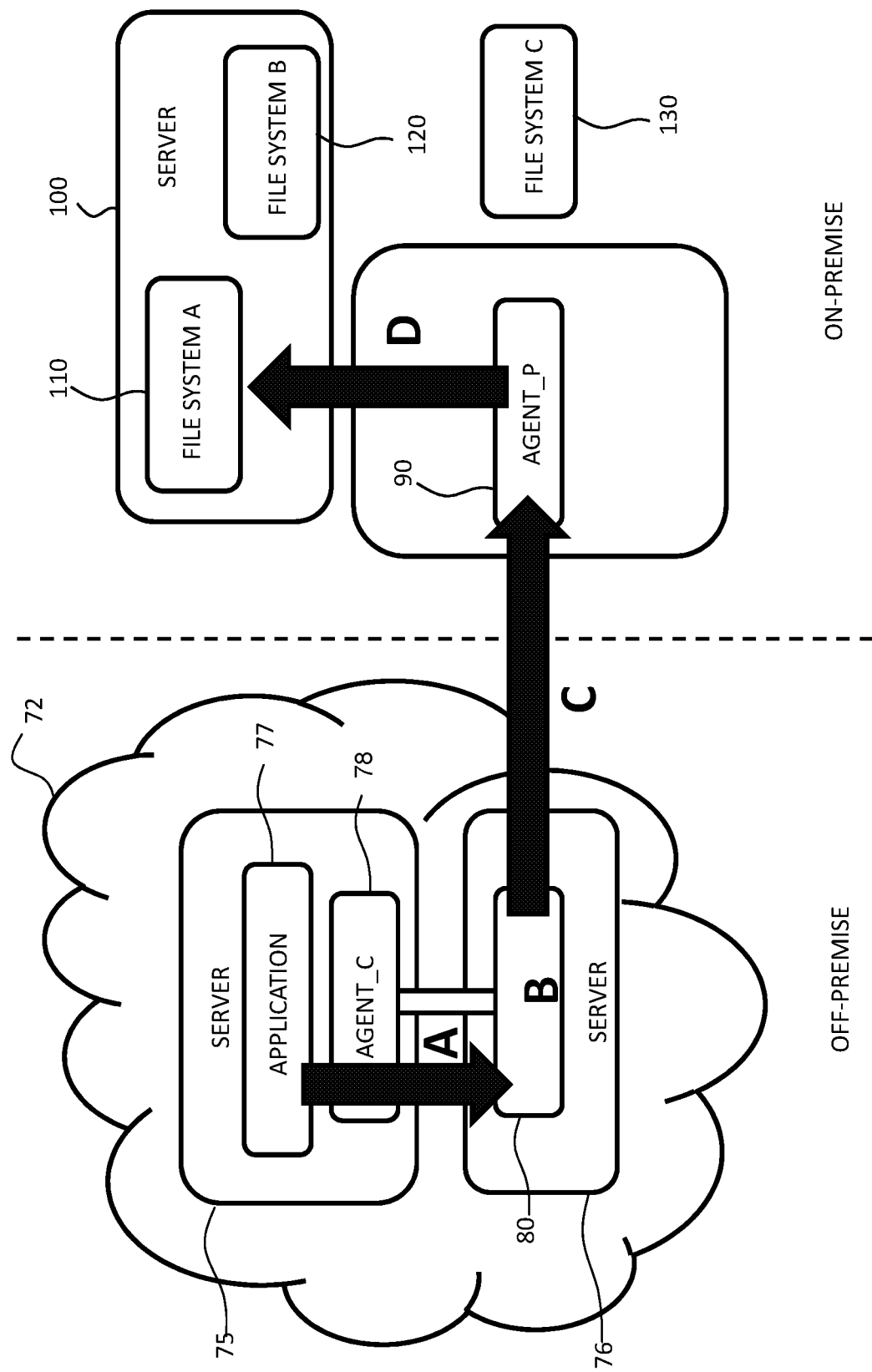
FIG. 2 depicts an example of the embodiment of FIG. 1 wherein a cloud-based application of the first server request a file event of the first file system, in accordance with aspects described herein.

Also, in the above example of FIG. 2, the first communication component 160 is adapted to receive a file system event request from the off-premises server 75, and the second communication component 170 is adapted to communicate the file system event request to an on-premises resource (such as the local agent 90). In this way, requests may be received from off-premises (e.g. cloud-based) resources and routed by the switching component 80 to the appropriate on-premises resource(s).

However, it is to be understood that, in other embodiments, requests may be received from on-premises resources and routed by the switching component 80 to the appropriate off-premises (e.g. cloud-based) resource(s). For example, the second communication component 170 may be adapted to receive a file system event request from an on-premises resource/server, and the first communication component 160 may be adapted to communicate the file system event request to an off-premises server. Such an arrangement may enable an on-premises resource to request/call an off-premises file system resource via the switching component 80, wherein the routing of the request/call is handled by the switching component.

Further, embodiments may also be adapted to enable the communication of a response from the requested/called file system back to the calling application. By way of illustration, in the example depicted in FIG. 2, the second communication component 170 may be adapted to receive a response to the communicated file system event request. The routing component 150 may then determine intended destination of the response (e.g. based on analysis of the response and/or stored data relating to previously communicated requests) and then pass the response to the first communication component 160 for communication to the application that originated the request (to which the response is responding). In this way, a response to a file system event request/call may be communicated back to the application (or resource) that originated the request/call. Proposed embodiments may therefore provide for the management of communication between off-premises and on-premises platforms so that requests and responses are appropriately delivered while avoiding excessive communication traffic.

As has been detailed above, routing of file system event requests may be implemented based on a data store (e.g. a database or lookup table) including data path information associated with file systems. The data store may be dynamically or automatically maintained so as to include up-to-date file system path data depending on available file systems or resources. By way of example, the data store may include information relating to file system names, server identifications, server addresses, file system version identifiers, and/or checksum information. Such file system path data may be provided to the data store by servers or applications using a registration process which thus enables the concept of updating/maintaining the data store in dynamic or automatic manner.

Figure 3A:
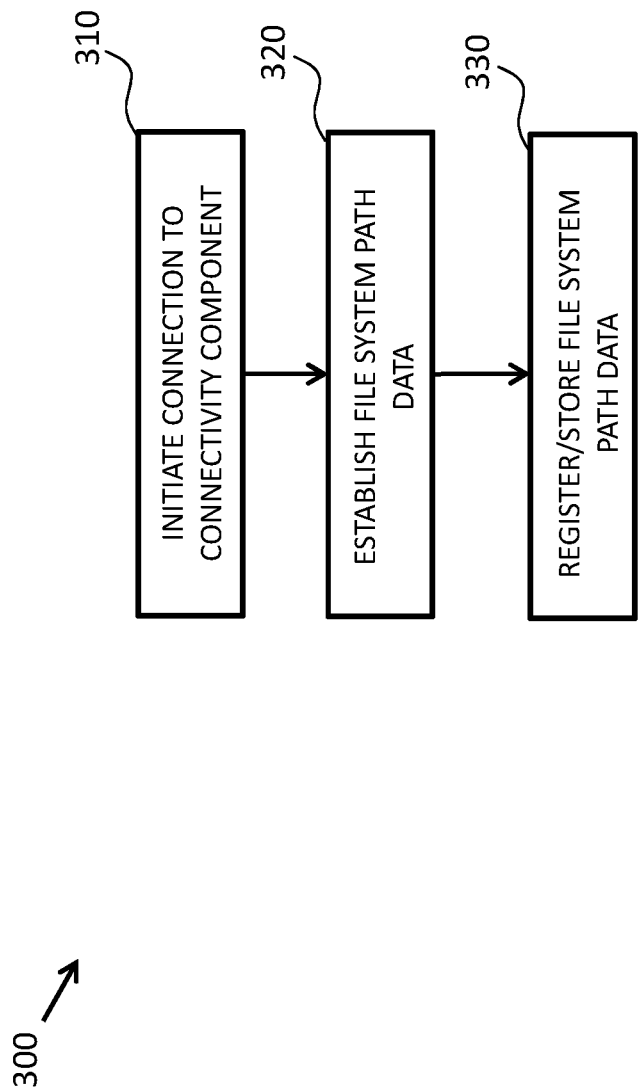
FIG. 3A depicts a flow diagram of a file system path data registration method according to an embodiment described herein.

Referring now to FIG. 3A, there is depicted a flow diagram of a file system path data registration method 300 that may be employed by an embodiment. Here the method is described as being implemented by a registration module (such as 175 of FIG. 1B) of a connectivity component (e.g. switching module) according to a proposed embodiment.

The method 300 begins at 310 wherein a connection to the connectivity component is initiated by an off-premises or on premises resource (such as a server module for example). By way of example, the off-premises or on-premises resource may set up a mutually authenticated TLS connection with a communication component/interface of the connectivity component.

Next, at 320, the file system path data associated with at least one file system is established. This may be done, for example, by receiving file system information of a file system from the resource that established the connection to the connectivity component. By way of example, the file system path data may include at least one of: a file system name, a server identification, a server address, a file system version identifier, supported file system event, permitted file system event, permission information, authentication information, and checksum information. File system path data may thus, for instance, include information relating to the identity of a file system. Such identification information may then be used to match a file system request to a system running the required file system. Alternatively, or additionally, file system path data may include information relating to a version or checksum in order to enable more complex matching. Alternatively, or additionally, file system path data may include information relating to the relative location of a file system path.

In this way, a server or application may directly provide file system path data for registration or storage by the connectivity component. Alternatively, file system path data may be obtained by querying the resource and thus actively seeking endpoint information of a file system (rather than simply automatically receiving such information in a passive manner). By way of example, file system path data may be extracted or determined through analysis of the established connection.

Finally, at 330, the established file system path data associated with this at least one file system is a registered/ stored in a data store of the connectivity component. Storage of such file system path data may be done in a structured manner using a relational database or table, for example.

Repeated execution of such a file system path data registration method 300 may therefore enable a data store to be built and maintained as and when new resources or file systems are made available via connection to the connectivity component.

Referring now to FIG. 3B, there is depicted a flow diagram of a method 350 for managing communication between off-premises and on-premises resources according to an embodiment. As with the method of FIG. 3A, the method 350 of FIG. 3B is described as being implemented by a connectivity component (e.g. switching module) according to a proposed embodiment.

The method 350 begins at 300, with the file system path data registration (as described with reference to FIG. 3A). In other words, the method may initially implement that file system path data registration method depicted in FIG. 3A, so that file system path data associated with available file systems is stored in a data store of the connectivity component. Once the file system path data registration process 300 is completed, and thus the data store is appropriately populated, the method proceeds to 360.

At 360, a file system event request is received by the connectivity component from an application of an off-premises server or an on-premises server. Here, the file system event request is received via a (previously) established secure tunnel. Also, the file system event request of this example may include a request to execute or invoke a file system which consists of or included a header or identification portion and a payload portion. The header/ identification portion may include information relating to the identification of the requested file system (such as a file system name for example), and the payload portion may include a data payload (such as data for use in/by the file system for example). By way of example, the file system event request may include at least one of: a file system name, file system event, a data payload, and entry point data. The file system event request may therefore include information relating to the file system, an event (e.g. read, write, delete, append, purge, edit, etc.) to be completed by the file system, data to be processed by the file system, and/or and entry point in the file system that the request would be made to. Inclusion of entry point data (such as path identification information, for example) in a file system event request may enable specification of an entry point in file system that the request is made to. For example, a file system called "filesystem1" could have two entry points called "path1" and "path2". The file system event request may then include the file system name and the entry point within the file system, such as "file system1/path1" for example. If no entry point information is employed, a default entry point (e.g. home/root directory or path) may be used.

Next, at 370, the received file system event request is processed in conjunction with data stored in the data store in order to determine a requested file system. For example, the connectivity component analyzes the identification portion of the received file system event request to identify the requested file system (for example, based on a file system name included in the identification portion). The method then proceeds to 380, wherein, based on the identified requested file system, the connectivity component queries the data store to identify file system path data that is associated with the identified requested file system. In other words, based on the identified requested file system, the connectivity component searches the data store to find a data entry/record for the requested file system and then extracts file system path data that is stored in the data entry/record for the requested file system.

At 390, the connectivity component then communicates the file system event request to an off-premises or on-premises resource based on the identified file system path data. For this purpose, an established secure tunnel is used to communicate the file system event request.

Thus, from the above description of the method of FIG. 3B, it will be appreciated that a method of receiving a file system event request and communicating (e.g. forwarding) the request to an appropriate endpoint (e.g. application or server module implementing a requested file system) may be provided. It should also be appreciated that the file system event request may or may not require a response to be provided (for example, back to the originator of the request).

In the case that a response is to be provided, the method 350 includes additional aspects 400 and 410. Aspect 400 includes receiving, at the connectivity component and via the same secure tunnel used to communicate the file system event request, a response to the file system event request. Then, at 410, the connectivity component routes the response to the appropriate direction, for example the originator of the file system event request. For this purpose, the connectivity component may use the data store, or another collection of information, to determine where to route the response. For instance, the connectivity component may be adapted to maintain a record of communicated file system event requests, along with destination or originator information. Such recorded information may then be analyzed in order to determine where to communicate a received response.

As detailed above, the data store of the connectivity component may be dynamically or automatically maintained using a registration/deregistration process so as to reflect changes in available file systems or resources. Thus, in addition to implementing the file system path data registration method 300 of FIG. 3A, a file system path data de-registration method may be employed. Such a de-registration process may be executed in response to changes in connectivity or file system resources for example. These changes may be signaled by the removal of resources or communication links, and/or may be indicated by signal or request indicating that a file system resource is to become unavailable/inaccessible. File system path data may therefore be removed from the data store by using a deregistration process which thus enables the concept of updating/maintaining the data store in dynamic or automatic manner.

Figure 3C:
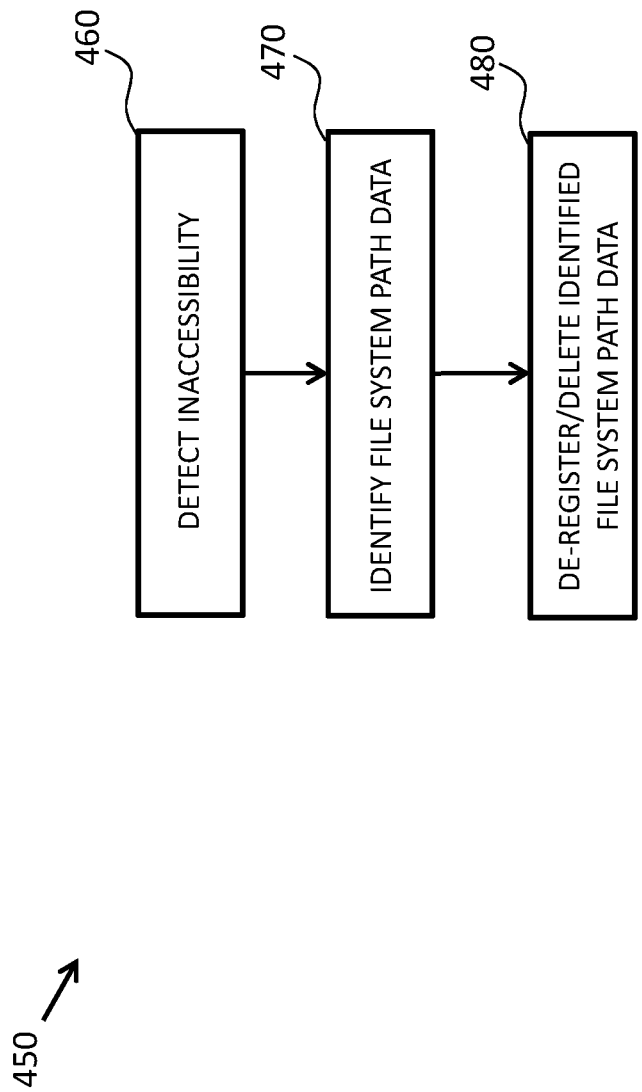
FIG. 3C depicts a flow diagram of a file system path data deregistration method according to an embodiment described herein.

Referring now to FIG. 3C, there is depicted a flow diagram of a file system path data deregistration method 450 that may be employed by an embodiment. Here, the method is described as being implemented by a registration module of a connectivity component (e.g. switching module) according to a proposed embodiment.

The method 450 begins at 460 wherein inaccessibility of an off-premises or on-premises resource (such as a file system, server, server module or secure tunnel for example) is detected. By way of example, the off-premises or on-premises resource may set up to communicate a signal to the connectivity component shortly before it becomes inaccessible. Detection of such a signal may then be used to detect pending or imminent inaccessibility of an off-premises or on-premises resource. Alternatively, or additionally, inaccessibility may be detected by detecting the loss of a secure tunnel connection, for example due to a server being disconnected, terminated, or powered-down.

Next, at 470, the file system path data associated with the inaccessible off-premises or on-premises resource is identified. This may be done, for example, by receiving information from the resource prior to it becoming inaccessible. In this way, a server or application may directly provide file system path data for deregistration or deletion by the connectivity component. Alternatively, file system path data may identified for deregistration or removal from the data store by querying the data store and thus actively endpoint information in the data store. By way of example, file system path data may be identified or determined through analysis of the lost connection in conjunction with the data store.

Finally, at 480, the identified file system path data associated with the inaccessible off-premises or on-premises resource is deregistered (e.g. removed) from the data store of the connectivity component.

Repeated execution of such a file system path data deregistration method 450 may therefore enable a data store to be maintained and updated as and when resources or file systems become unavailable to the connectivity component.

It will therefore be understood that embodiments may be adapted to add and remove information from the file system path data store in response to status changes in an application, a server, and/or a file system of off-premises and on-premises resources. Put another way, embodiments may dynamically update or maintain any structured data resource in order to reflect changes in available file systems.

It will be appreciated that embodiments, such as that presented above with reference to their figures may provide the benefit of reducing the amount of data that passes between data file systems in off-premises and on-premises platforms. This may be done in two ways:

(i) the developer has the ability to pass only what is required in order to invoke a file system; and (ii) the format of the data that gets crossed across the secure tunnel is compressed to a binary format will such as Efficient XML Interchange (EXI), protocol buffers, or a similar scheme.

It is also noted that embodiments may enable an off-premises file system to not need any secure information (e.g. database user credentials, ports, IP addresses, etc.).

Through program flow analysis, embodiments may enable a better understanding of application requirements and will therefore avoid propagation of multiple data formats simultaneously, which will in turn reduce associated memory requirements.

As will be apparent from the above description, an off-premises resource may be provided by a cloud-computing system. Also, a connectivity component or method for managing communication between off-premises and on-premises platforms may be provided or implemented by a cloud-computing system.

With reference to the following description made with regard to a cloud computing system, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premises cloud model may include at least five characteristics, at least three service models, and at least four deployment models.

Characteristics are as Follows:

On-demand self-service: a cloud consumer can unilaterally provide computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
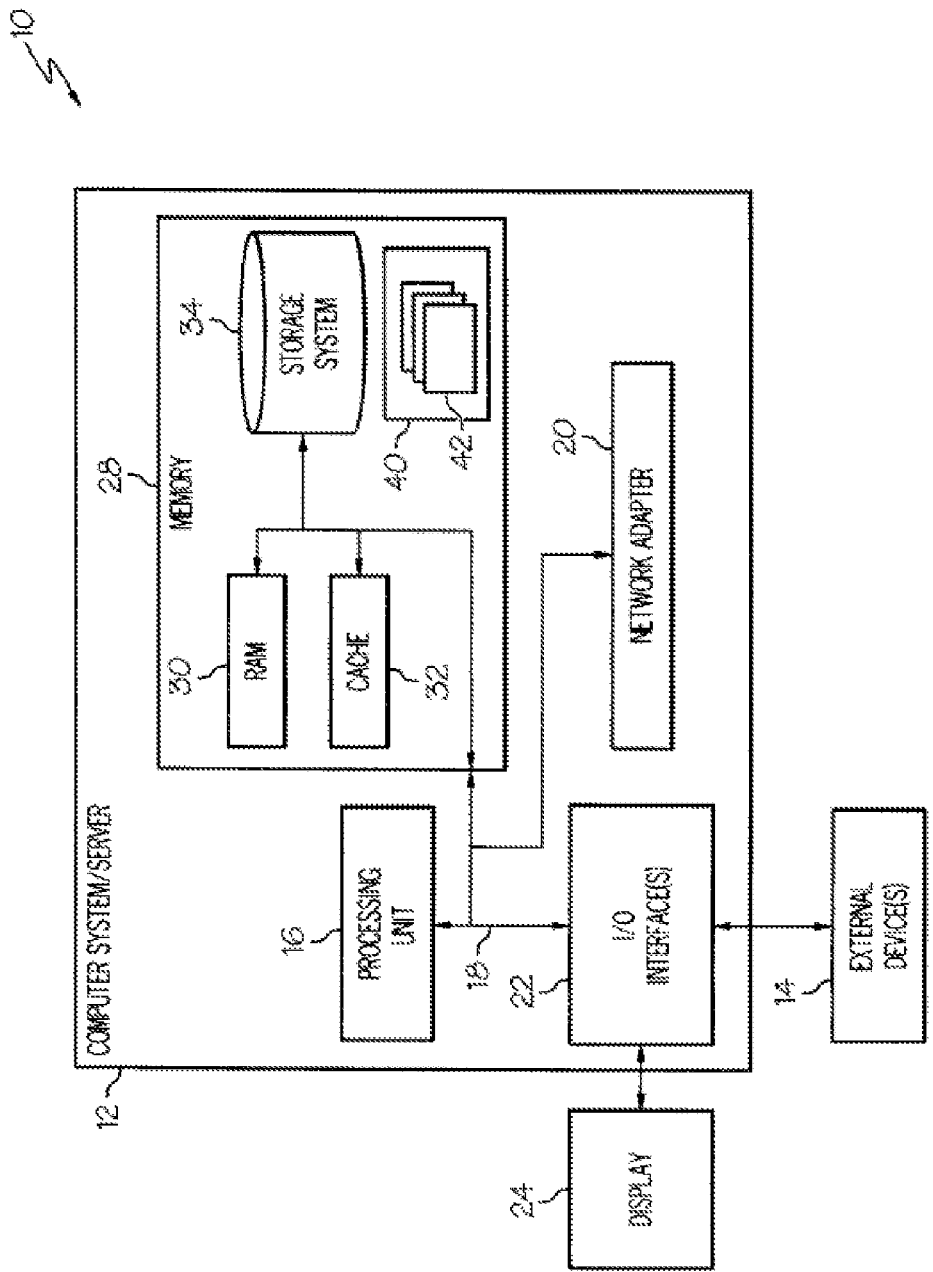
FIG. 4 illustrates a cloud system node according to aspects described herein.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
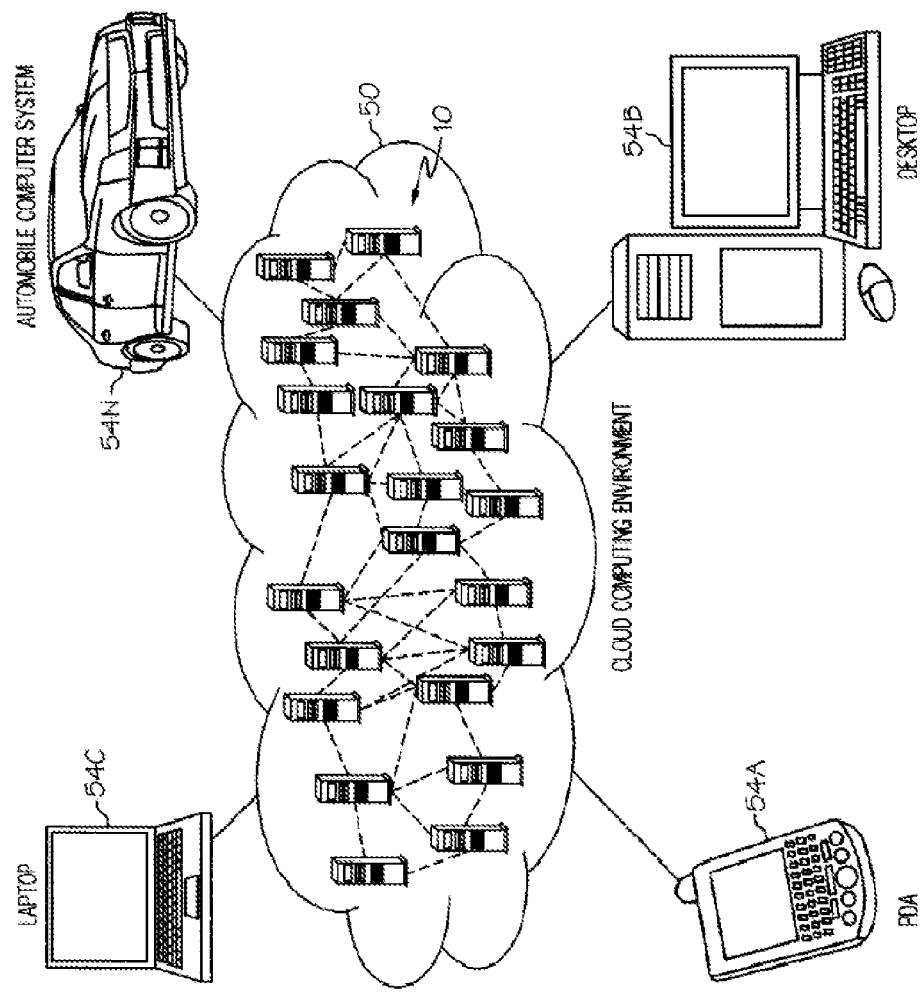
FIG. 5 illustrates a cloud computing environment according to an embodiment described herein.

Referring now to FIG. 5, illustrative cloud computing environment or cloud computing system 50 is depicted. This can, in embodiments, be equated to the cloud computing system as depicted in FIG. 1A for example. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
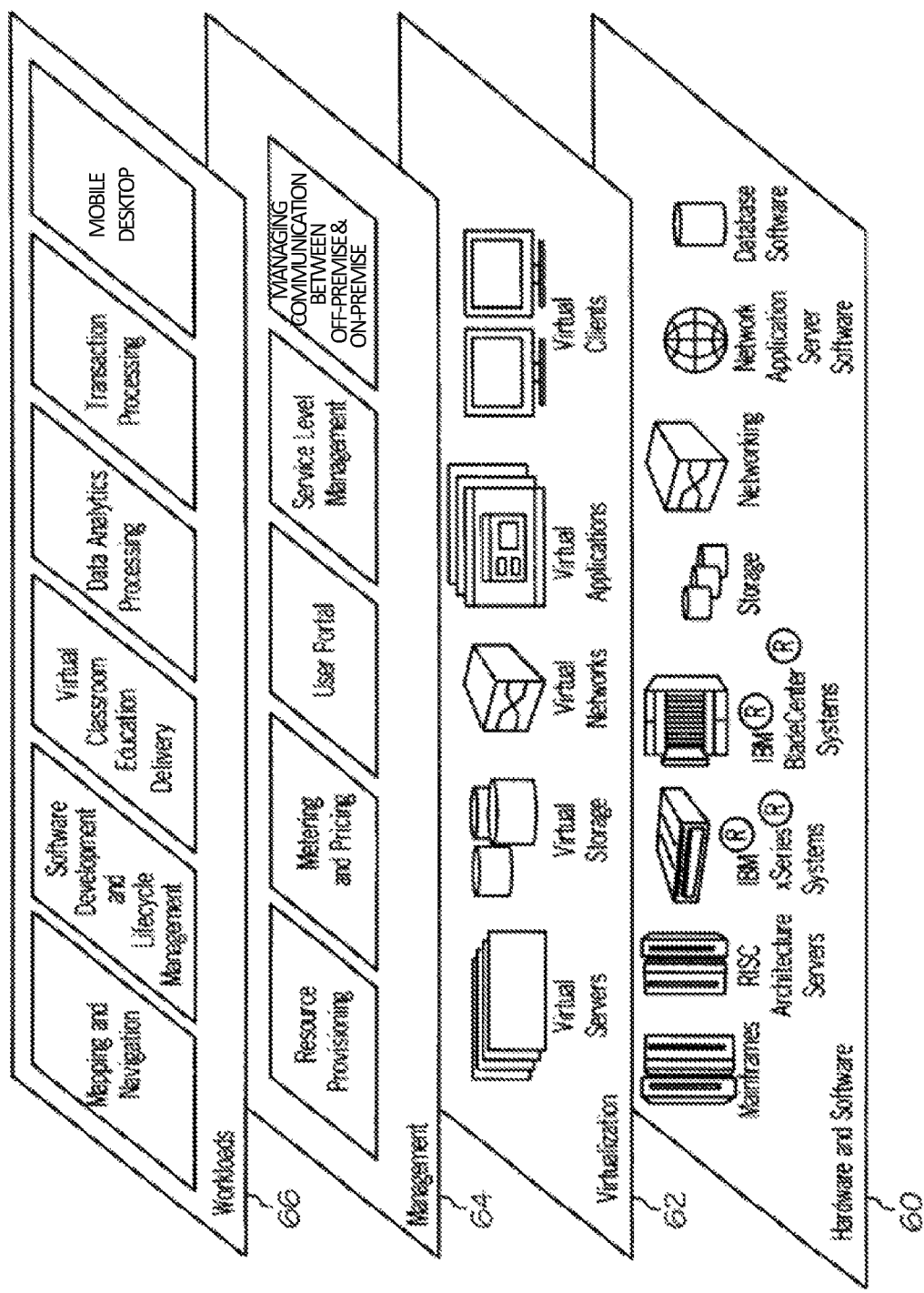
FIG. 6 illustrates cloud abstraction mode layers according to an embodiment described herein.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Managing communication between off-premises and on-premises platforms provides for calling or requesting of file systems between off-premises and on-premises resources, according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In the context of the present application, where embodiments of the present invention constitute a method, it should be understood that such a method is a process for execution by a computer, i.e. is a computer-implementable method. The various aspects of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiments were chosen and described in order to best explain various aspects and the practical application, and to enable others of ordinary skill in the art to understand various embodiments with various modifications as are suited to the particular use contemplated.

What is claimed is:

1. A computer system comprising:
a memory comprising program instructions; and
a processor in communication with the memory, wherein the computer system is configured to perform a method upon execution of the program instructions by the processor, the method comprising:
storing, in a file system path data store, file system path data associated with a plurality of different remote file systems, the file system path data store being part of a switch component of a first network of a first location, the first network also comprising a first server in communication with the switch component across the first network, the remote file systems being of different servers of a plurality of different networks of different locations remote from the first location, wherein the first network is in communication with the plurality of different networks across one or more wide area network communication links, and wherein the stored file system path data comprises, for each remote file system of the remote file systems, a respective identification of a server, of the different servers, of which the remote file system is a part;
receiving, across the first network, by the switch component, a file system event request from an application of the first server, the file system event request being a request by the application for a file system event to be completed against a requested remote file system of the remote file systems, the requested file system being a remote file system of a second server at a second location remote from the first server at the first location;
processing, by a routing component of the switch component, the file system event request in conjunction with the stored file system path data, the processing comprising:
identifying the requested file system, from the plurality of different remote file systems for which the file system path data is stored, based on an identification portion of the received file system event request identifying that the requested file system is the remote file system; and
identifying, from the stored file system path data, file system path data associated with the requested file system, the file system path data associated with the requested file system comprising the identification of the second server of which the requested file system is a part; and
communicating, by the switch component, the file system event request to the second server based on the identified file system path data associated with the requested file system identifying that the requested file system is of the second server.

2. The computer system of claim 1, wherein the first server comprises an off-premises server and the second server comprises an on-premises server.

3. The computer system of claim 2, wherein the receiving the file system event request receives the file system event request from the off-premises server, and the communicating the file system event request communicates the file system event request to the on-premises server based on the identified file system path data.

4. The computer system of claim 1, wherein the first server comprises an on-premises server and the second server comprises an off-premises server.

5. The computer system of claim 4, wherein the receiving the file system event request receives the file system event request from the on-premises server, and the communicating the file system event request communicates the file system event request to the off-premises server based on the identified file system path data.

6. The computer system of claim 1, wherein the first server comprises an off-premises cloud server, and wherein the application is provided as a service of the off-premises cloud server.

7. The computer system of claim 1, wherein the method further includes receiving file system path data from at least one selected from the group consisting of: an application of an off-premises server, an application of an on-premises server, an off-premises server module, and an on-premises server module.

8. The computer system of claim 1, wherein a registration module of the switch component is adapted to store received file system path data in the file system path data store.

9. The computer system of claim 8, wherein the registration module is adapted to remove file system path data from the file system path data store in response to at least one selected from the group consisting of: an application, a server, and a file system becoming inaccessible.

10. The computer system of claim 6, wherein the received file system path data comprises at least one selected from the group consisting of: a file system name of the remote file system, a server identification of the second server, a server address of the second server, a file system version identifier of a version of the remote file system, supported file system events, permitted file system events, permission information, authentication information, and checksum information.

11. The computer system of claim 1, wherein the file system event request comprises at least one selected from the group consisting of: a file system name of the remote file system, file system event, a data payload, and entry point data.

12. The computer system of claim 1, wherein the method further includes receiving by the switch component a response to the communicated file system event request, and communicating, by the switch component, the received response to the application.

* * * * *